CODE WHEEL SELECTION OF PRINTED CIRCUIT SINGLE PATHS

Filed Dec. 17, 1964 3 Sheets-Sheet 1

INVENTOR.
HAROLD G. O'BRIEN
BY
Joseph A. Speldrick
AGENT

July 11, 1967 H. G. O'BRIEN 3,331,067

CODE WHEEL SELECTION OF PRINTED CIRCUIT SINGLE PATHS

Filed Dec. 17, 1964 3 Sheets-Sheet 2

INVENTOR.
HAROLD G. O'BRIEN
BY
Joseph A. Speldick
AGENT

July 11, 1967 H. G. O'BRIEN 3,331,067

CODE WHEEL SELECTION OF PRINTED CIRCUIT SINGLE PATHS

Filed Dec. 17, 1964 3 Sheets-Sheet 3

INVENTOR.
HAROLD G. O'BRIEN
BY
Joseph A. Speldrick
AGENT

United States Patent Office 3,331,067
Patented July 11, 1967

3,331,067
CODE WHEEL SELECTION OF PRINTED CIRCUIT SINGLE PATHS

Harold G. O'Brien, Minneapolis, Minn., assignor to Sperry Rand Corporation, New York, N.Y., a corporation of Delaware Filed Dec. 17, 1964, Ser. No. 419,249
9 Claims. (Cl. 340—357)

ABSTRACT OF THE DISCLOSURE

An electro-mechanical encoding system with rotatable code wheels co-acting with printed circuit conductors on a cylindrical support member for providing patterns of encoded signals on output leads indicative of the position of the code wheels is described. A system for scanning the output leads for providing signals as inputs to a utilization device is described. Alternate embodiments wherein one system utilizes the code wheels external to the support member and one embodiment utilizes the code wheels internal to the cylindrical support member are shown.

This invention relates generally to an alpha numeric data transmitting device for translating mechanical motion into an electrical representation in terms of a binary code wherein transmitted data is utilized as an input to a computer.

In the present stage of data transmitting technology a requirement for an electrical pulse code transmitting device consisting of a compact, light, and portable machine is necessitated. Moreover, the structural and operating characteristics of the present invention contribute to reliability, ruggedness, and simplicity of operation. Additional features include a direct visual indication of the particular setting affected to the device, reduction of wiring requirements through the use of printed circuits, and minimal components for a data transmitting device.

The development of electronic and other types of fast operating data transmission (or remote control) equipment between a central computer and a sub site has necessitated the development of a simplified data transmission device. Inasmuch as the electronic systems are complex and expensive, a sub facility has been designed to supply data transmission signals in a simple, yet thoroughly effective manner.

Many solutions to this problem have been proposed in the past but all have involved either costly mechanical apparatus or complex electronic apparatus. The immediate invention translates mechanical rotation of a code wheel into an electrical representation in terms of a binary code through the use of printed circuitry. Basically, the invention involves rotating code wheels which are designed to set up a binary pattern of energization on output leads. Each code wheel is inscribed with a finite number of characters each one of which is represented by a different pattern of energization applied to the output leads.

According to the present state of technology such as disclosed in Patent 2,885,774, there is characterized the use of coding strips mechanically disposed and guided under a hold down plate having guiding grooves. Contact strips are positioned accordingly by sliding to a desired character. Sequential readout of the characters set up is accomplished by a mobile contactor mounted upon a traversing tape which must be returned to an initial point of origin for a subsequent readout or a repeat of the same message. Reliance upon a mechanical mobile operator which traverses the coding strips and makes contact with a continuous electrode upon penetrating a perforation in a coding strip may fail to provide a proper output signal. The contactor may have a tendency to vibrate when penetrating the perforation, particularly if the tape speed is of a large magnitude, thus introducing the possibility of error. Wearing of the mobile contactor as well as of the perforations are additional factors which may lead to the introduction of errors.

Specifically, the subject invention is characterized in a preferred form by a hand operated input device wherein a plurality of code wheels are mounted for rotation about a cylindrical member (curved printed circuit board) having printed circuitry formed thereon.

Each code wheel contains alphanumeric information thereon. The operator sets up a message by selecting a character on each code wheel and positioning the wheel to a certain position, such as to an index arrow on the cylindrical member. The electrical circuitry utilized to carry out the operation of the coding device consists of external and internal printed circuits on the curved printed circuit board. The two types of printed circuits on the outside of the cylinder are the common buses and the character buses. The former are disposed transversely of the longitudinal dimension of the cylindrical member and are situated below each of the respective code wheels. Their number corresponds to the number of code wheels. The number of character buses correspond to the number of specific types of characters on the code wheels. To electrically interconnect a respective common bus with a character bus, each code wheel has embedded internally therein a shorting link having brush contacts. Read out operations of the code setup are accomplished by scanning switch assembly mounted in one end of the cylindrical member. Internal printed circuit conductors extend from individual common buses to the end of the cylindrical member in which the scanning switch assembly is located. The character buses are connected to common buses by the code wheel shorting link and the common buses are connected to scanning switch contacts by internal printed circuit conductors. Each of the character bus bars is provided with a group of diodes on the diode board to encode the character selected. The encoded information is then passed on via a cable to the output relays which are in parallel hookup. The number of diodes operatively associated with the respective character buses is not limited to three as illustrated in FIGURE 4.

In another form of the invention, the code wheels are located internally of the cylinder and are in contact with external printed circuitry of the cylinder via a common brush element. A contact strip mounted on a segment of each internal wheel contacts the common brush element and also mounts a spring brush which cooperates with the internal printed circuit character buses. The character buses in turn are in circuit with a group of diodes and relays, for example, as set out in a detailed manner in the following explanation:

A primary object of the present invention is to provide a manually operated alpha numeric data input device to a computer.

Another object of the present invention is to provide a data transmission device for translating mechanical position into an electrical representation.

Another primary object of the present invention is to provide a manual input device for a computer utilizing a curved printed circuit board.

Another important object of the present invention is to provide an alpha numeric input device for a computer wherein code wheels containing information characters are disposed externally along the longitudinal axis of a cylindrical member.

Another object of the present invention is to provide an alpha numeric input device for a computer wherein information wheels are located internally of a cylindrical member.

Yet another important object of the present invention is to provide an alpha numeric input device for a computer wherein coded information is read out by a scanning mechanism.

Still another important object of the present invention is to provide an alpha numeric input device to a computer wherein external and internal printed circuitry provide electrical circuity path from a scanning switch to output leads.

A further important object of the present invention is to provide an alpha numeric input device wherein the code wheels are manually adjustable to set up desired information.

Yet another object of the present invention is to provide data transmission apparatus wherein information set up on the apparatus is transmitted to circuitry components to provide a coded binary representation of the information setup.

A further object of the present invention is to provide a data input device providing sequential reading of setup information.

Still another object of the present invention is to provide an inexpensive simplified multipositioned switch mechanism for data character selection.

Yet another object of the present invention is to provide a multipositioned switch for data character selection utilizing printed circuits.

An additional object of the present invention is to provide a data input device wherein information is manually set into the device by way of actuating levers extending through slits in the face of the cylindrical member.

An additional important object of the present invention is to provide an input to a computer which is a binary representation set up by the code wheels.

These and other more detailed and specific objects will be disclosed in the course of the following specification, reference being had to accompanying drawings in which.

Figure 1:
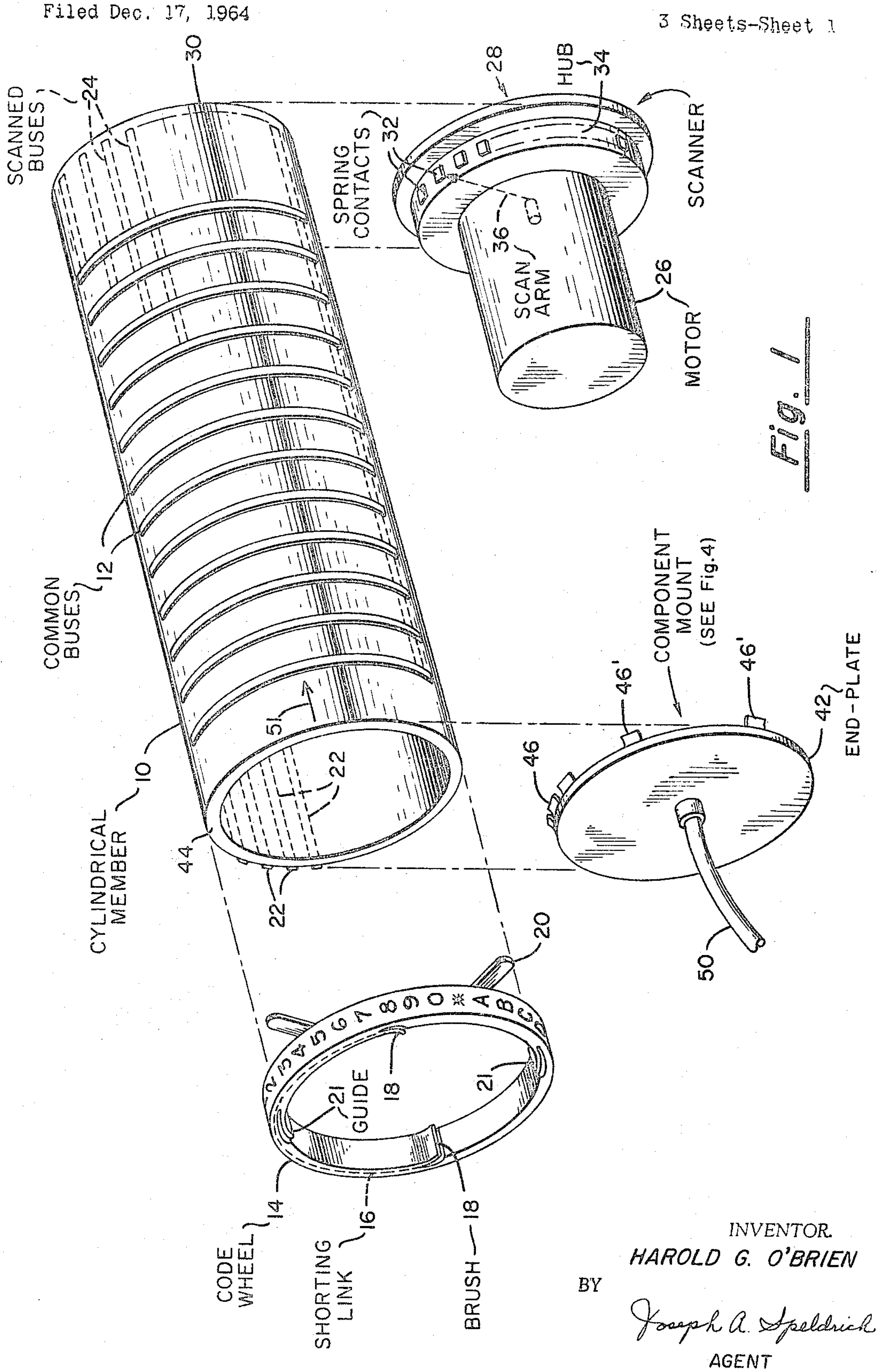
FIGURE 1 is a perspective view of a preferred embodiment of the invention in a disassembled condition.
Figure 2:
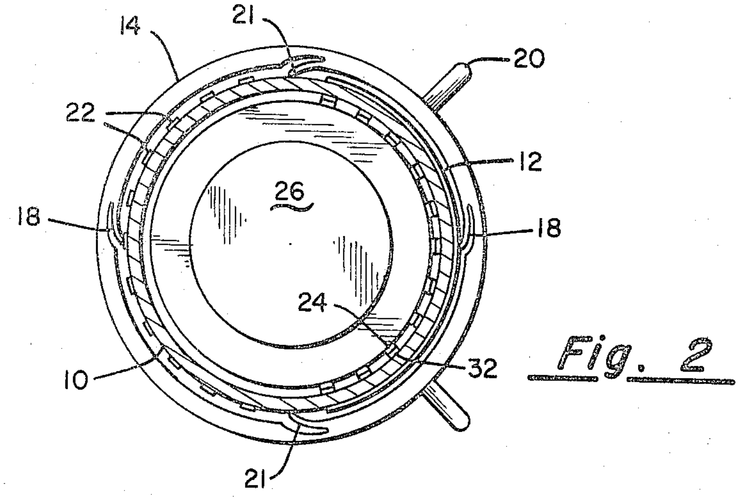
FIGURE 2 is an end view of FIGURE 1.

Referring now more particularly to the preferred embodiment illustrated in FIGURE 1, the identification system there represented in an exploded form comprises the cylindrical member 10 having formed thereon by a process well known in the art, printed circuit conductors. On the external surface of the cylindrical member 10, there are located a plurality of printed circuits in the form of common buses 12 extending transverse to the longitudinal axis of the cylindrical member 10. Each of the common buses has mounted there over a code wheel which is cylindrical in design. The code wheels are accumulatively disposed end to end over the cylindrical member 10. Inasmuch as each code wheel is similar in construction to the other, only one wheel 14 has been shown. It is to be understood that the cylindrical member 10 could be made as long as desired to accommodate a greater number of code wheels for a particular application. By way of reference to code wheel 14, there is disposed within the code wheel a shorting link 16 having upturned ends or contact brushes 18. Shorting link 16 is of a greater length than its associated common bus 12 such that only one contact brush 18 will be in contact with a common bus for any position of the code wheel.

The code wheels may be formed integrally from an insulating material such as plastic or by any other suitable material. Each wheel may be formed around the shorting link 16 with insulating material extending just short of the contact brushes 18. To provide concentric mounting of the code wheels over the cylindrical member 10, the internal portion of each wheel has formed therewith guide points 21 which, together with the conductive brush portions 18 of the shorting link provide a concentric mounting of the wheels on the cylindrical member 10. Mounted on one side face of the code wheel 14 are one or more actuating levers 20 effective for manually transmitting an operating force or setting force to the code wheel by an operator. The particular location of the lever 20 is intended to be illustrative only rather than limitative inasmuch as the lever could as well be mounted to the face of the code wheel or some other suitable location on the wheel.

Referring once again to the cylindrical member 10 in FIGURE 1, character buses 22 in the form of printed circuitry are disposed externally of the cylindrical member. Each character bus extends the full length of the cylindrical member and is disposed along one portion of the external circumference of the cylindrical member. The number of character buses 22 is dependent upon the number of different types of information characters on the code wheels. For example, if there are 10 code wheels and a particular code wheel contains 15 characters and the remaining code wheels have fewer characters, but contain identical characters, the number of character buses would be 15.

Referring to FIGURE 1 again, longitudinally extending printed circuits 24 interconnect individually with each of the common buses 12 and terminate at the right end of the cylindrical member 10. Each of the printed circuits 24 is disposed internally of the cylindrical member 10. As is evident from FIGURE 1, it can be observed that succeeding printed circuit elements 24 become increasingly longer from one common bus to the next and so on throughout the whole length of the cylindrical member 10. Suitable interconnections are made between the terminal portions of the conductors 24 and their respective common buses 12.

From FIGURE 1, it can be observed that three sets of printed circuit conductors are utilized in the instant invention. Character buses 22 and common buses 12 are disposed externally of the cylindrical member and printed circuit buses 24 connected to respective character buses are disposed internally of the cylindrical member.

Figure 5:
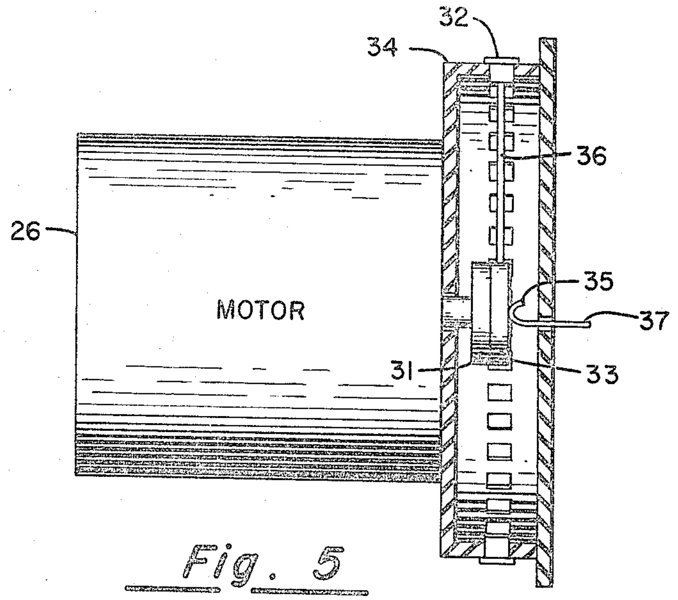
FIGURE 5 is an illustration of the scanning switch assembly used with the inventions of FIGURES 1 and 3.

A motor 26 and scanning switch assembly 28 is adapted to fit internally of the cylindrical member as illustrated. The scanning switch 28 has mounted thereon a group of suitable spring contacts 32 which are mounted in a hub portion 34 and extend therethrough to make contact with conductors 24. The entire assembly, mounted in the end 30 of the cylindrical member 10, is stationarily disposed. Mounted to the output shaft of motor 26 is a scanning arm which rotates in accordance with the r.p.m. of the motor to sequentially make contact with the spring contacts 32. The scanning switch assembly 28 accommodates the scanning arm 36 within the hub portion 34. By way of reference to FIGURE 5, the preferred arrangement of the scanning switch includes an insulating member 31 having a conductive portion 33 thereon for mounting the scanning arm 36. A wiping brush 35 is in wiping contact with the conductive portion 33 and is mounted in the scanner assembly wall. The brush 35 has a tab portion 37 projecting externally of the wall for a common ground connection.

A diode board or end plate 42 is adapted to fit on the left end 44 of the cylindrical member 10 as illustrated in FIGURE 1. Spring contacts 46, mounted on the diode board 42 in a suitable manner are adapted to slip over the end of the cylindrical member 10 to make electrical interconnection with the character buses 22, there being as many electrical contacts 46 as there are character buses. Referring momentarily to FIG. 1, the diode board further has mounted thereon a plurality of diodes 48 operatively connected to relays 49 by cable 50, and electrically interconnected in a logical manner as dictated by the particular code being used. Additional spring elements are dummy elements 46' used to hold the diode board to the cylindrical member and have no electrical interconnection with the diodes. It is to be noted that other structural configurations for the diode board be utilized in place of that illustrated. The arrangement (not shown) would bear resemblance to the scanner switch in that the diode board hub would fit internally of the cylindrical member having spring contacts making contact with the respective character buses and suitably interconnected in an electrical manner with respective diodes on the end wall of the diode board assembly. It is also evident that the hub portion of the diode board may have printed circuit conductors making contact with the character buses of the embodiment in FIGURE 3 as well as printed circuit conductors electrically interconnected with respective diodes. Diodes in the set utilized by the instant invention may also be of the integrated circuit variety and contained within the end wall of the diode board assembly or end plate whatever the configuration used. It is evident that a great variety of modifications are possible to provide the suitable electrical interconnections between the character buses and the diode circuitry and come within the scope of the present invention.

Relay cable 50 extends from the diode board to the relays, the latter of which are connected to the computing device utilizing the information being transmitted. It is to be understood that the circuitry components are not limited to diodes and relays, but rather any other suitable electrical circuit components that provide the desired output for a computer.

OPERATION

*Embodiment I*

By way of example, a particularly suitable application for the coding device is in an airlines reservation system. The remote data input device makes it of unique character in a reservation type application and contains features which also makes it applicable in a variety of other system applications as mentioned below. More specifically, by way of reference to FIGURE 1, it can be seen that various wheels may contain specific airlines reservation type information. A particular application of the instant invention describes a remote data entry device having the capability of allowing manual setup of a fixed length, fixed format message and transmitting over telegraphic or telephonic lines to a central computer site. By utilizing a plurality of code wheels along the longitudinal axis of the device, code wheels may be inscribed with typical airlines reservation information such as transaction character information airlines identification information, flight number information, flight classification, day and month in which the flight is to take place, number of seats being reserved, city from which the flight is originating, intended destination of the flight, the name of the person making the flight reservation, and so on. It is evident then that any number of wheels can be used depending upon the length of message desired to be transmitted.

Figure 4:
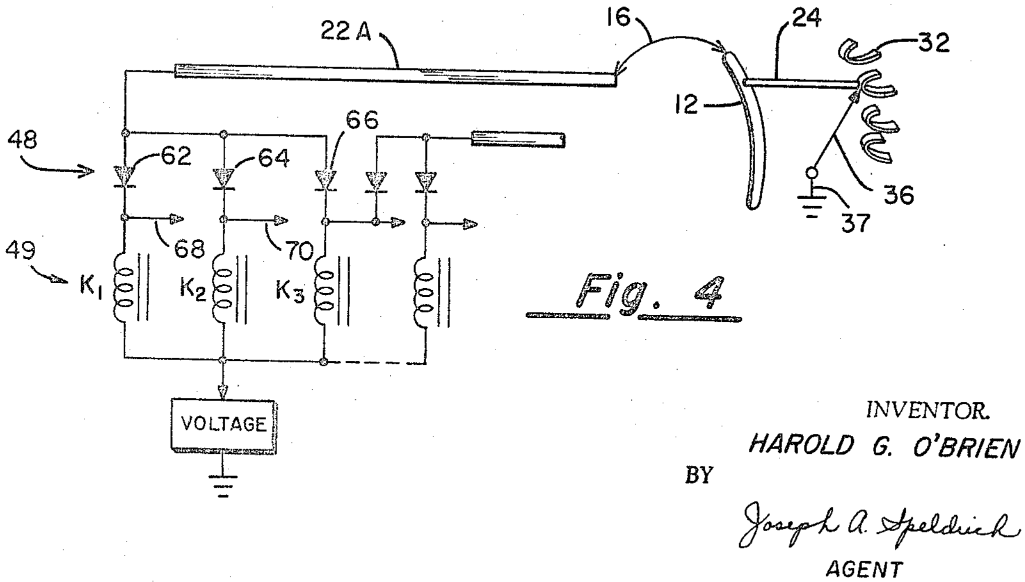
FIGURE 4 is a schematic illustration of the circuitry used with the preferred form of the invention illustrated in FIGURE 1.

To operate the code device, an operator manually sets up the information by rotating the code wheels using the actuating levers extending from the wheels. The character selected is set up by aligning the character opposite an index mark inscribed on the cylindrical member. By rotating each wheel, the shorting link contact portions within each code wheel make contact on one end with a respective common bus bar and at the other end to a corresponding character bus such as 22A (see FIG. 4). In order to read out the codes a voltage is sequentially applied to the common buses for each code wheel. As the scanning switch motor is energized, the scanning switch sequentially makes electrical contact with the switch contacts on the hub portion of the scanning assembly which are in ultimate electrical contact with the externally disposed character bus 22A. Accordingly, a closed circuit is sequentially established from the common ground 37 through the scanning switch, the spring contacts, the internal printed circuits, the common bus, the associated code wheel shorting link, the character bus 22A, the corresponding conductive spring contact of the diode board, and finally to the diode and relay circuitry and power source to ground. Referring now in detail to FIG. 4, there is illustrated a typical character bus 22A shown to be electrically interconnected to diodes 62, 64, 66 and relay circuitry $K_1$, $K_2$, $K_3$ energized upon grounding of character bus 22A as a result of scanning switch operation. As evident, the number of relays that are to be energized depends upon and is determined by the particular character bus selected and the number of diodes connected to the character bus; and as shown in FIGURE 4 utilization of relays for additional characters may be accomplished as desired by interconnecting leads 68 and 70 via other diodes and other character buses.

Figure 3:
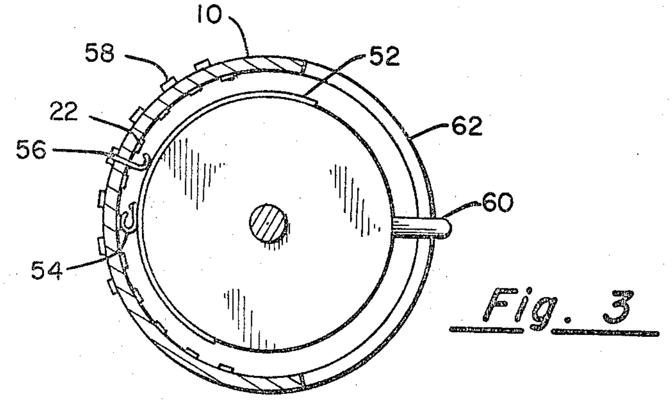
FIGURE 3 is an end view of another embodiment of the invention.

According to another embodiment of the invention, illustrated in end view in FIGURE 3, each of the code wheels 14 has mounted thereon a contact strip 52 with a spring brush contact 54 fixedly secured to the contact strip 52. The cylindrical member 10 again has printed circuit character buses 22, but in the immediate embodiment the conductors or buses are disposed internally of the cylindrical member. A common brush 56 is secured to and extends from the cylindrical surface to make contact with the contact strip 52 of the respective code wheels. Each of the common brushes 56 of each code wheel is interconnected with a respective printed circuit conductor 58 disposed externally of the cylindrical member 10. The common brush is designed to be fixedly secured to cylindrical casing and extends therethrough to interconnect the common brush with the external bus 58 and the contact strip 52. As is evident from FIGURE 3, the external conductors and internal conductors are disposed along one portion of the circumference of the cylindrical member. Each of the external conductors extends almost the full longitudinal length of the cylindrical member 10. The motor scanning switch assembly, which is essentially the same as that illustrated in the preferred embodiment of FIGURE 1, is disposed within the right end of the cylindrical member. To provide electrical access between the switch contacts 32 and the external conductive elements, holes are formed, for example, in the cylindrical member 10 from the inside to the external conductors. As is evident from FIGURE 1, it can be observed that as the scanning switch arm 36 rotates, it makes sequential contact with the spring contacts 32. The spring contacts 32 are modified in any suitable manner to make electrical contact through the perforations or holes in the cylindrical members with the external conductors 58.

As can be observed from FIGURE 3, the character buses 22 and the external conductors or buses 58 are disposed along one portion of the circumference of the cylindrical member. Actuating lever 60, attached to the code wheels 14 may project through relatively wide slits 62 in the face of the cylindrical member 10. A guide arrow or index marker may again provide the aligning index when manually setting up the particular character information on the code wheel 14 opposite a desired address on the cylindrical member 10. However, in a preferred manner, the slits 62 take the configuration of a relatively narrow transversely extending slit for the actuating lever 60 with an enlarged window area cut to one side of the slit so as to expose the characters on the code wheels therebeneath through the window areas. No intention is made, however, to limit the slits solely to a narrow configuration. When information is set up on the respective code wheels, the associated spring brush 54 of each code wheel is set into contact with one specific character bus 22. The diode board or end plate may be similar to that illustrated in FIGURE 1 and has the spring contacts disposed such that when the diode board or end plate is fitted to the left end of the cylindrical member 10, the spring contacts make contact internally of the cylindrical member with the internal printed circuit character bus conductors. The diode board may be modified as explained above.

Figure 6:
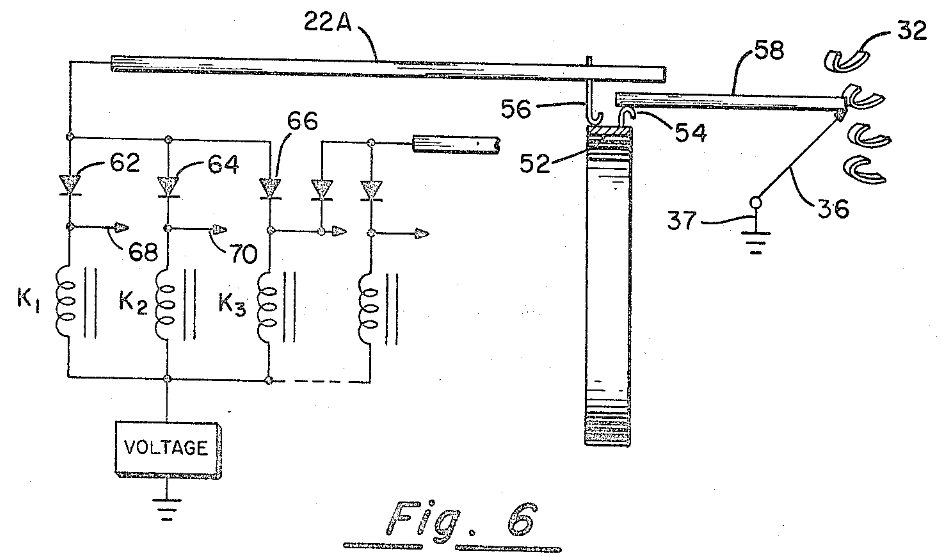
FIGURE 6 is a schematic illustration of the circuitry used with the embodiment illustrated in FIGURE 3.

Referring to FIGURE 6, the electrical circuitry associated with the immediate embodiment to provide a coded output to the computer is shown. By way of explanation, it can be seen that the diodes and relays may be interconnected in any desired logical manner in accordance with the particular type of code being utilized.

*Embodiment II*

Operation of the embodiment illustrated in FIGURE 3 is essentially the same as that of the preferred embodiment. The operator manually sets up the information by rotating the internally disposed code wheels as in the preferred embodiment. Upon completing selection of the desired information on the code wheels, the scanning switch motor is energized for sequentially scanning the external buses. The scanning switch arm makes sequential contact with each of the spring contacts of the scanning switch assembly. A closed circuit including a voltage source is established from ground, through the scanning switch arm, the spring contacts, an external bus, the common brush, the contact strip, the spring brush, a character bus, spring contacts of the diode board, and the diode and relay circuitry to ground.

There is one common brush for each external conductor and one spring brush secured to the contact strip of each code wheel. Considering each code wheel individually, the position of the spring brush relative to a character bus will be determined by the particular information or character set up by the operator. As seen in FIGURE 6, the code wheel and its spring brush have been rotated to electrically locate the brush with respect to character bus 22A. Accordingly, during the scanning operation, the scanning switch arm eventually closes the circuit through character bus 22A to provide a readout operation.

By way of explanation, further applications within the scope of the invention include usage by a stockbroker at a place of business to interrogate a computer managed information central and stock exchange about any of the usually significant factors such as averages, price earnings ratios, dividends, shares traded, current quotations, etc. and to initiate transactions in any of the stocks managed by the computer central. A local index of stocks managed by the computer central and their identifying symbols provides the broker with the fixed information required. The device may be connected to the computer central via a standard teletype or telephone line.

To use the instant invention, a subscribing broker selects the identifying symbol of the stock in which he is interested and sets the corresponding stock symbol code wheels. A good example of the invention in the stock market procedure would probably include some code wheels directed to buy, others to sell, others as to the number of shares, others as to the stock symbol, others as to price per share and so forth.

Data transmission apparatus such as that described in the immediate specification, may have further use with secrecy communication and identification having utility in a system for identifying moving aircraft rapidly. It is desirable that such a code-setting apparatus be relatively simple in construction and yet capable of developing one or ones of a multiplicity of code combinations.

It is also evident to those skilled in the art the instant invention may contain logical functions which generate message parity characters for error checking.

It is understood that suitable modifications may be made in the structure as disclosed provided such modifications come within the spirit and scope of the appended claims. Having now, therefore, fully illustrated and described my invention, what I claim to be new and desire to protect by Letters Patent is set forth in the appended claims.

What is claimed is:

1. In a signal code pulse transmitting device wherein a cylindrical printed circuit member means mounts a plurality of code wheels containing character information thereon and are selectively positionable with respect to conductor means on said cylindrical printed circuit member means, encoding apparatus comprising: a plurality of conductor means; a shorting link secured within each of said code wheels for operatively connecting each of the respective shorting links to selected ones of said conductor means; an encoder means coupled to predetermined ones of said conductor means through respective ones of said shorting links; a scanning switch assembly mounted with said cylindrical printed circuit member means for sequentially reading out the information set up on the code wheels through an electrical circuit including said scanning switch assembly, said conductor means, said shorting link, and said encoder means; and output circuitry coupled to said conductor means for electrically coupling coded signals to a computer when activated by said scanning switch assembly.

2. In a data transmission device comprising: a cylindrically shaped printed circuit support member including at least one externally exposed character bus extending the length of the support member, at least one externally exposed common bus extending transverse to and along only a portion of the support member, at least one internally exposed bus extending from contact with the common bus to one end of the support member; an index marker disposed on said support member; at least one code wheel supported by said support member and located directly over the common bus and adjacent the index marker, the code wheel being cylindrically shaped to be concentric with respect to the support member, said code wheel being inscribed with information characters, said code wheel having centering elements for centering the wheel about the support member, actuating means secured to said wheel, a conducting link operatively associated with said wheel, said conducting link extending in conformance with an inside surface and along only a portion of said wheel, said link terminating with contact brush portions, said link only electrically interconnecting said common bus with said character bus upon setting up the code wheel information corresponding to the character bus, whereby one of said brush portions contacts said common bus and another one of said brush portions contacts said character bus.

3. The invention defined in claim 2 wherein said cylindrical support member further contains a plurality of character buses, common buses, and internal buses and further supports a plurality of code wheels.

4. The invention defined in claim 2 including a sequential scanner including driving means, a scanning switch arm assembly, a reference potential conductor, and at least one spring switch contact, said scanner being mounted within one end of the support member, said spring switch contact being in electrical contact with said internally exposed conductor; and an end-plate adapted to fit at another end of said cylindrical member and mounting at least one spring contact adapted to make frictional and electrical contact with said character bus.

5. The invention defined in claim 4 wherein said cylindrical support member further contains a plurality of character buses, common buses, and external buses and further supports a plurality of code wheels; and wherein said scanner driving means is attached to a hub element additionally mounting a plurality of said spring switch contacts whereby energization of said driving means causes said switch arm to rotate and make sequential electrical contact with said spring switch contacts to make a closed circuit interconnection through said ground conductor, switch arm, a spring contact, an internal bus, a common bus, a conducting link, a character bus, an end-plate conductive spring contact, the encoder circuitry, and output circuitry means to produce an electrical signal output for a computer.

6. The invention defined in claim 4 wherein said end-plate supports encoder circuitry operatively connected to said spring contact and to said character bus, whereby energization of said scanner assembly and application of a voltage to the character bus causes the encoding circuitry to encode the information set up by the position of said code wheel.

7. The invention defined in claim 6 wherein said end-plate contains integrated circuitry encoder apparatus operatively connected to said spring contact and to said character bus.

8. A data transmitting device for a computer comprising: a cylindrical shaped printed circuit member, said member containing conductors extending longitudinally along the external surface of said cylindrical member, each conductor being successively shorter and extending to one end of said cylindrical member, said conductors being included along only a portion of the circumference of said member, said member further including a plurality of character bus conductors extending parallel to said external conductors and extending internally the full length of said member; a plurality of code wheels mounted within said member and each having secured thereto a common contact strip portion; said code wheels each mounting a contactor element to provide a contactor element to provide a conductive path from said strip portion to respective character buses; a plurality of common contactors for each code wheel secured to said cylindrical member and extending therethrough, each of said common contactors being mechanically and electrically interconnected at one end to a respective one of said external conductors and at another end makes wiping contact with said strip portion.

9. In a data transmitter device providing a coded output comprising: a cylindrical printed circuit member having internal and external surfaces and supporting external printed circuit character buses, a plurality of external printed circuit common buses extending transfers to a longitudinal axis of said cylindrical member, said common buses being flush with a circumferential portion of said external surface of said cylindrical member and extending around only a portion of said member, and internal printed circuit elements in electrical contact with and extending to one end of said cylindrical member, an indicator means described upon the cylindrical surface adjacent each of said common buses, code members having actuating means for setting up information and being mounted over said cylindrical member and directly over respective ones of said common buses, each of said code members including a shorting link secured within said code member for electrically connecting said common bus and the selected one of said character buses, a scanner mounted within said end of said cylindrical member for reading out information set up by said code wheels, said scanner including a driving means, switch contact means in contact with respective ones of said internal printed circuit elements, and a scanner arm driven by said driving means for sequentially making electrical contact with said contact means, and a cover plate secured to another end of said cylindrical means for mounting circuit components.

References Cited

UNITED STATES PATENTS 3,204,236 8/1965 Duris -------------- 340—357

NEIL C. READ, *Primary Examiner.*

THOMAS B. HABECKER, *Examiner.*

UNITED STATES PATENT OFFICE
CERTIFICATE OF CORRECTION

Patent No. 3,331,067 July 11, 1967

Harold G. O'Brien

It is hereby certified that error appears in the above numbered patent requiring correction and that the said Letters Patent should read as corrected below.

Column 3, line 11, for "path" read -- paths --; column 4, line 58, after "arm" insert -- 36 --; column 10, line 8, for "extending transfers" read -- extended transverse --.

Signed and sealed this 1st day of October 1968.

(SEAL)
Attest:

Edward M. Fletcher, Jr.
Attesting Officer

EDWARD J. BRENNER
Commissioner of Patents